United States Patent
Watanabe et al.

(10) Patent No.: US 12,130,618 B2
(45) Date of Patent: Oct. 29, 2024

(54) IN-VEHICLE UNIT, IN-VEHICLE SYSTEM, AND VEHICLE

(71) Applicant: TOYOTA JIDOSHA KABUSHIKI KAISHA, Toyota (JP)

(72) Inventors: Isao Watanabe, Nagoya (JP); Kanade Kuriyama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 573 days.

(21) Appl. No.: 17/342,127

(22) Filed: Jun. 8, 2021

(65) Prior Publication Data
US 2022/0011769 A1   Jan. 13, 2022

(30) Foreign Application Priority Data
Jul. 7, 2020   (JP) .................................. 2020-117352

(51) Int. Cl.
*G05D 1/00*   (2024.01)
*G06F 8/61*   (2018.01)
*G06F 8/71*   (2018.01)

(52) U.S. Cl.
CPC ......... *G05D 1/0022* (2013.01); *G05D 1/0016* (2013.01); *G06F 8/61* (2013.01); *G06F 8/71* (2013.01)

(58) Field of Classification Search
CPC ............... G05D 1/0022; G05D 1/0016; G05D 2201/0213; G06F 8/61; G06F 8/71; G06F 8/62; B60W 50/04
See application file for complete search history.

(56) References Cited

U.S. PATENT DOCUMENTS

| | | | |
|---|---|---|---|
| 2002/0083430 A1* | 6/2002 | Kusuda | G06F 9/4411 717/174 |
| 2005/0162688 A1* | 7/2005 | Nakaoka | G06F 3/1288 358/1.15 |
| 2007/0158404 A1* | 7/2007 | Li | H04L 41/06 235/375 |
| 2013/0139001 A1 | 5/2013 | Yamauchi | |

(Continued)

FOREIGN PATENT DOCUMENTS

| | | | |
|---|---|---|---|
| CN | 105975348 A | * | 9/2016 |
| JP | H11-053289 A | | 2/1999 |
| JP | 2000-330777 A | | 11/2000 |

(Continued)

OTHER PUBLICATIONS

CN-105975348-A_English Translation (Year: 2016).*
JP-2010262661-A_English Translation (Year: 2010).*

*Primary Examiner* — Rachid Bendidi
*Assistant Examiner* — Dana F Artimez
(74) *Attorney, Agent, or Firm* — Oliff PLC

(57) ABSTRACT

An in-vehicle system enables retrofitted hardware to be used in cases in which predetermined hardware has been connected to an in-vehicle unit by performing processing to obtain an application corresponding to the predetermined hardware from a server and install the application in the in-vehicle unit. In cases in which the retrofitted hardware has been disconnected from the in-vehicle unit, the in-vehicle system also performs at least one type of processing out of processing to compress or processing to delete the application corresponding to the retrofitted hardware that has been disconnected.

10 Claims, 8 Drawing Sheets

(56) References Cited

U.S. PATENT DOCUMENTS

2017/0072794 A1  3/2017  Buttolo et al.

FOREIGN PATENT DOCUMENTS

| JP | 2003-84978 A | | 3/2003 | |
|----|---|---|---|---|
| JP | 2010262661 A | * | 11/2010 | ............ G06F 9/4411 |
| KR | 101835396 B1 | | 3/2018 | |
| WO | 2012/095960 A1 | | 7/2012 | |
| WO | 2013/105869 A1 | | 7/2013 | |

* cited by examiner

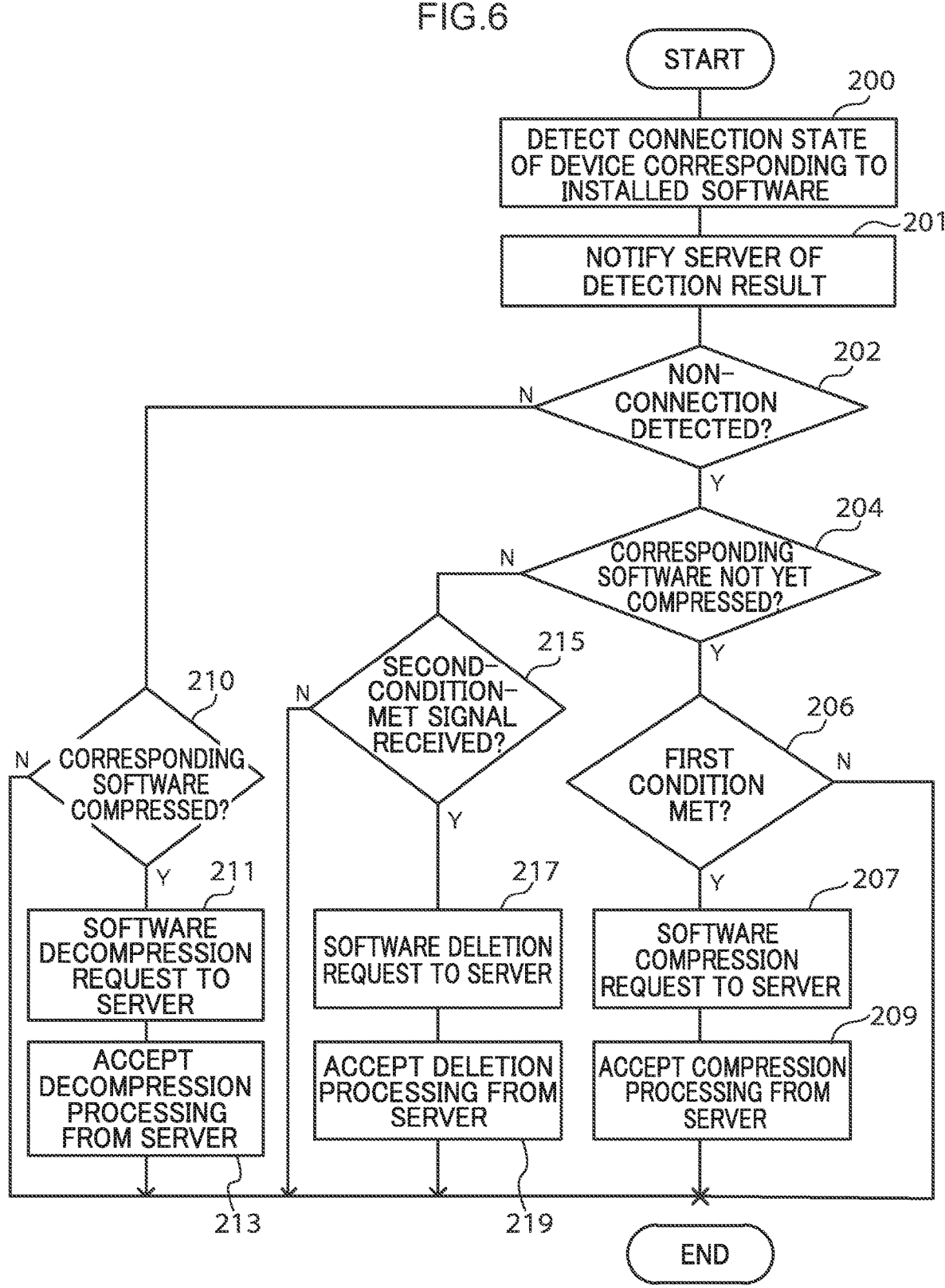

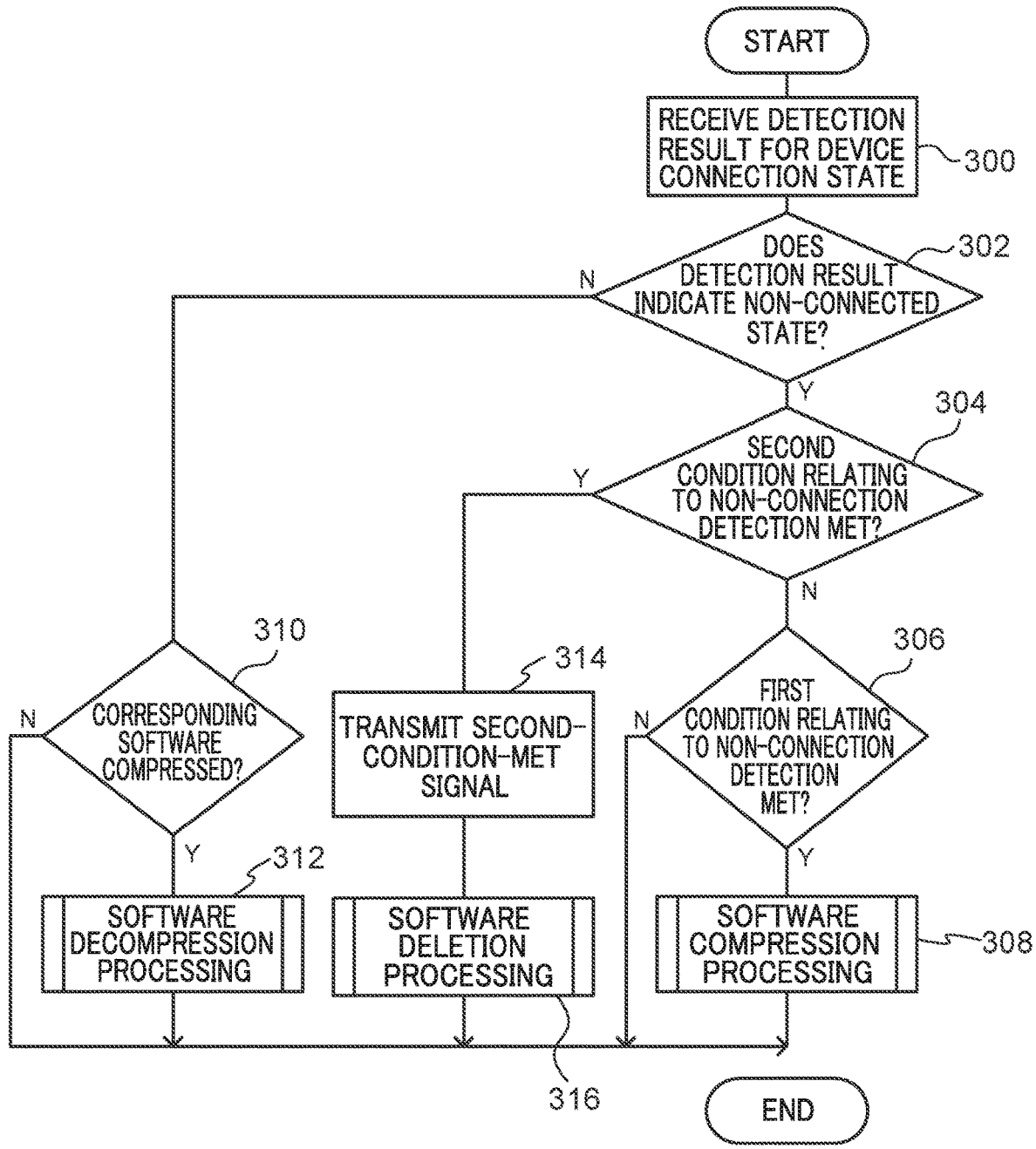

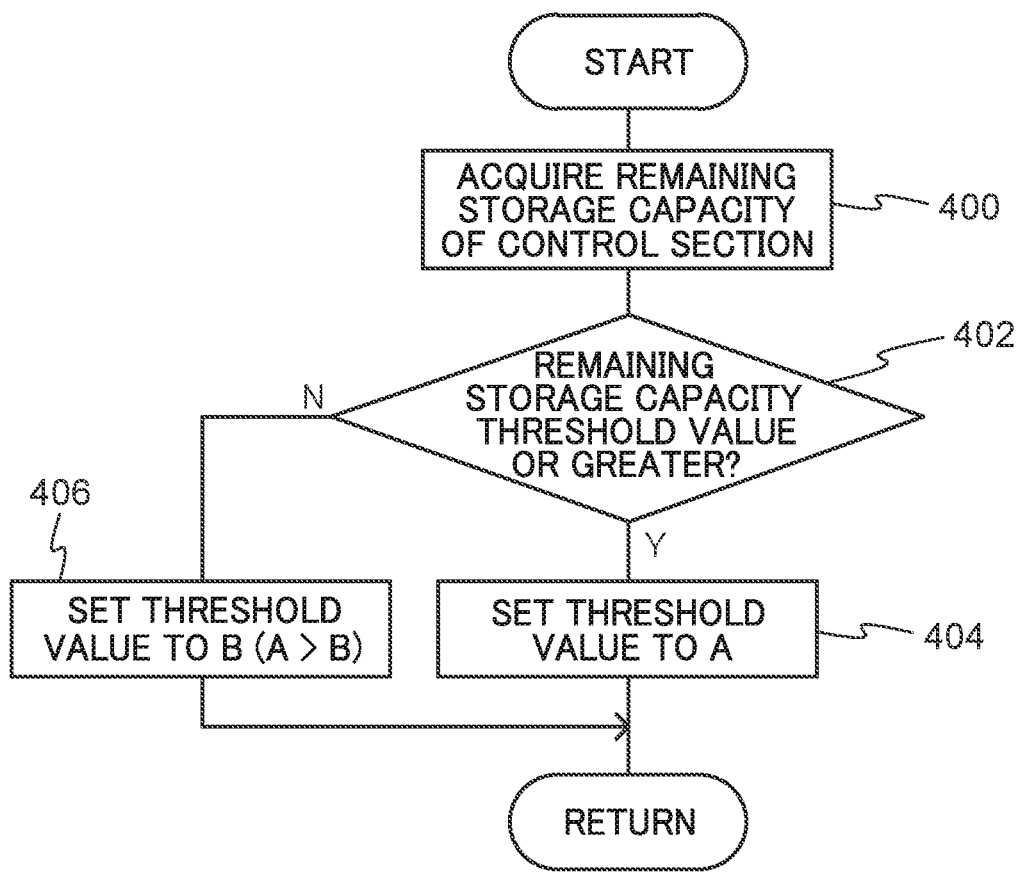

IN-VEHICLE UNIT, IN-VEHICLE SYSTEM, AND VEHICLE

CROSS-REFERENCE TO RELATED APPLICATION

This application is based on and claims priority under 35 USC 119 from Japanese Patent Application No. 2020-117352 filed on Jul. 7, 2020, the disclosure of which is incorporated by reference herein.

BACKGROUND

Technical Field

The present disclosure relates to an in-vehicle unit, an in-vehicle system, and a vehicle.

Related Art

Japanese Patent Application Laid-Open (JP-A) No. H11-053289 (Patent Document 1) proposes an information processing device. An expansion unit such as a peripheral device or expansion board/card connected to the information processing device is provided with a storage device used to hold software data, for example driver software. When this peripheral device or the like is connected to the information processing device, the expansion software data held in the storage device is read and forwarded to the information processing device. The information processing device compares the version of the forwarded software data against that of software data in its own storage device, and writes the more recent version of the software data to memory for the expansion software data of the information processing device to use in driving or information processing of the peripheral device or the like.

However, although Patent Document 1 is capable of installing software corresponding to the connected hardware in order to enable the hardware to be used, if this hardware is later disconnected and no longer used, the software remains in the information processing device. There is room for improvement in this respect, since this is detrimental to efficient usage of the storage capacity of the information processing device.

SUMMARY

In consideration of the above circumstances, the present disclosure provides an in-vehicle unit, an in-vehicle system, and a vehicle capable of installing software corresponding to connected hardware, and also enabling more efficient use of storage capacity.

An in-vehicle unit according to a first aspect includes a detection section configured to detect whether or not predetermined hardware is connected, a communication section configured to perform external communication, and a control section configured to control so as to receive software corresponding to the hardware via the communication section and install the software in cases in which connection of the hardware has been detected by the detection section, and to perform at least one type of processing out of compression processing to compress the software or deletion processing to delete the software in cases in which non-connection of the hardware has been detected by the detection section.

According to the first aspect, the detection section detects whether or not the predetermined hardware is connected, and the communication section performs communication with an external server or the like.

In cases in which connection of the hardware has been detected by the detection section, the control section controls so as to receive the software corresponding to the hardware via the communication section and install the software. This enables retrofitted hardware to be used.

In cases in which non-connection of the hardware has been detected by the detection section, the control section performs at least one out of the compression processing to compress the software or the deletion processing to delete the software. Namely, the compression processing or deletion processing enables storage capacity to be secured in cases in which the hardware has been disconnected and is no longer used, thereby enabling this storage capacity to be used more efficiently.

Configuration may be made such that when performing the compression processing, the control section performs the compression processing in cases in which a state of the non-connection detected by the detection section satisfies a predetermined first condition. This enables the storage capacity to be used more efficiently. Moreover, should the hardware be reconnected, the software can easily be used again.

Configuration may be made such that when performing the compression processing and the deletion processing, the control section performs the deletion processing in cases in which a predetermined second condition has been satisfied after the first condition has been satisfied. Software with a low usage frequency is thus deleted, enabling the storage capacity to be used more efficiently.

Moreover, configuration may be made wherein the control section is configured to adjust the second condition to a predetermined condition according to a storage capacity of a storage section in which the software is stored, and then determine whether or not the adjusted second condition has been met. This enables the deletion processing to be performed more readily as the storage capacity decreases, thereby enabling the storage capacity to be used more efficiently.

Moreover, configuration may be made wherein the control section is configured to adjust the first condition to a predetermined condition according to a storage capacity of a storage section in which the software is stored, and then determine whether or not the adjusted first condition has been met. This enables the compression processing to be performed more readily as the storage capacity decreases, thereby enabling the storage capacity to be used more efficiently.

Moreover, configuration may be made wherein the control section further performs decompression processing to decompress the software in cases in which connection of the hardware has been detected by the detection section after the first condition has been satisfied. This enables the software to easily be used again, without the need to reinstall the software when the hardware is reconnected.

Moreover, configuration may be made wherein the control section performs at least one out of the compression processing or deletion processing by external remote operation via the communication section. This enables the capacity required to store compression and deletion programs in the in-vehicle unit to be reduced, thus enabling the storage capacity to be used even more efficiently.

Note that as in an eighth aspect, an in-vehicle system may be configured including a detection section configured to detect whether or not predetermined hardware is connected to an in-vehicle unit, an installer configured to control to install software corresponding to the hardware in the in-vehicle unit in cases in which connection of the hardware has been detected by the detection section, and a control section configured to perform at least one type of processing out of compression processing to compress the software or deletion processing to delete the software in cases in which non-connection of the hardware has been detected by the detection section.

Moreover, as in a ninth aspect, a vehicle may be configured including a detection section configured to detect whether or not predetermined hardware is connected, a communication section configured to perform external communication, and a control section configured to control so as to receive software corresponding to the hardware via the communication section and install the software in cases in which connection of the hardware has been detected by the detection section, and to perform at least one type of processing out of compression processing to compress the software or deletion processing to delete the software in cases in which non-connection of the hardware has been detected by the detection section.

As described above, the present disclosure is capable of providing an in-vehicle unit, an in-vehicle system, and a vehicle capable of installing software corresponding to connected hardware, and also enabling more efficient use of storage capacity.

BRIEF DESCRIPTION OF DRAWINGS

FIG. 6 is a flowchart illustrating an example of a flow of processing performed by an in-vehicle unit of an in-vehicle system according to the second exemplary embodiment when performing processing according to a connection state of a retrofitted device corresponding to installed software.

FIG. 7 is a flowchart illustrating an example of a flow of processing performed by a server of an in-vehicle system according to the second exemplary embodiment when performing processing according to a connection state of a retrofitted device corresponding to installed software.

FIG. 8 is a flowchart illustrating an example of a flow of processing to adjust respective conditions for meeting a first condition and a second condition according to a remaining storage capacity of an in-vehicle unit.

DETAILED DESCRIPTION

Figure 1:
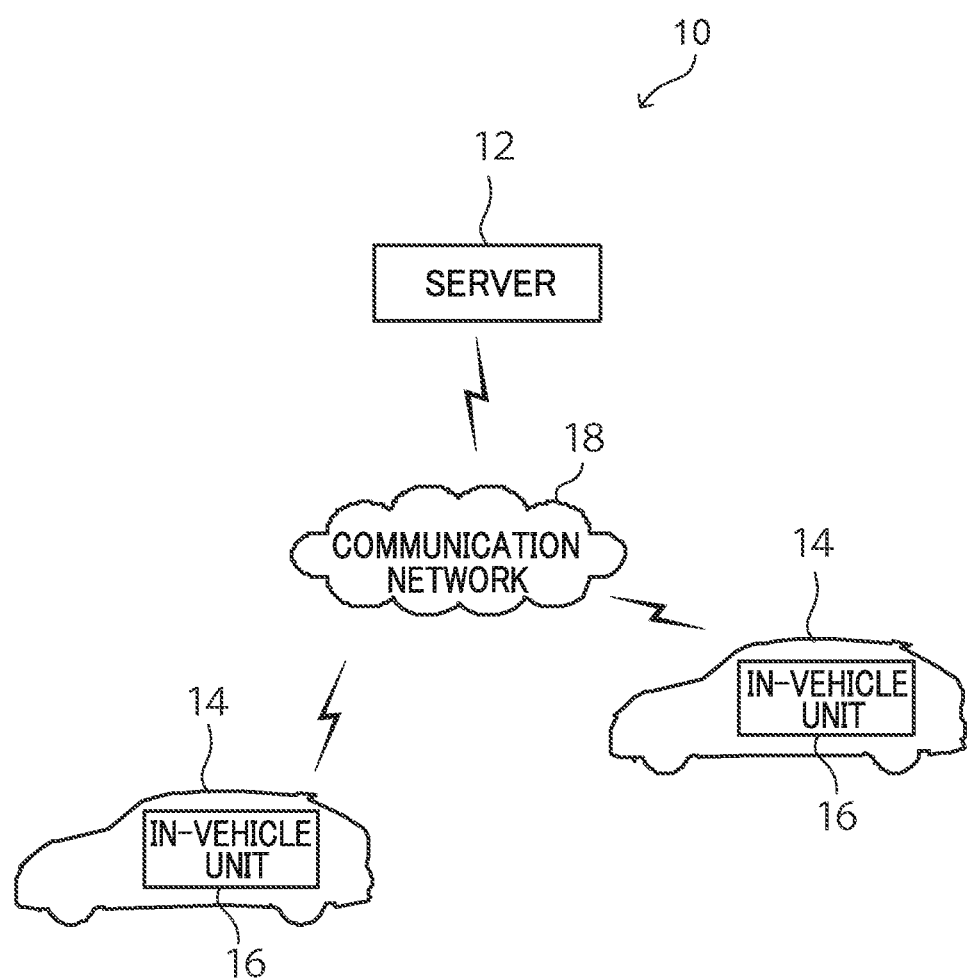
FIG. 1 is a diagram illustrating a schematic configuration of an in-vehicle system according to an exemplary embodiment.

Detailed explanation follows regarding examples of exemplary embodiments of the present disclosure, with reference to the drawings. FIG. 1 is a diagram illustrating a schematic configuration of an exemplary embodiment of an in-vehicle system.

As illustrated in FIG. 1, the in-vehicle system 10 according to the present exemplary embodiments includes a server 12 and plural in-vehicle units 16, each connected together through a communication network 18.

In the in-vehicle system 10 according to the present exemplary embodiment, information is exchanged between the server 12 and the in-vehicle units 16 in order to perform processing to enable the in-vehicle units 16, installed in plural vehicles 14, to connect to and use retrofitted hardware. Specifically, in cases in which predetermined hardware is connected to the in-vehicle units 16, processing is performed to install a corresponding application obtained from the server 12 in the in-vehicle unit 16 in order to enable use of the retrofitted hardware.

When the retrofitted hardware has been disconnected from the corresponding in-vehicle unit 16, the in-vehicle system 10 according to the present exemplary embodiment further performs at least one type of processing out of processing to compress or processing to delete the application corresponding to the retrofitted hardware that has been disconnected. Note that although two of the vehicles 14 are illustrated in FIG. 1, a single vehicle 14, or three or more of the vehicles 14, may be present.

First Exemplary Embodiment

Figure 2:
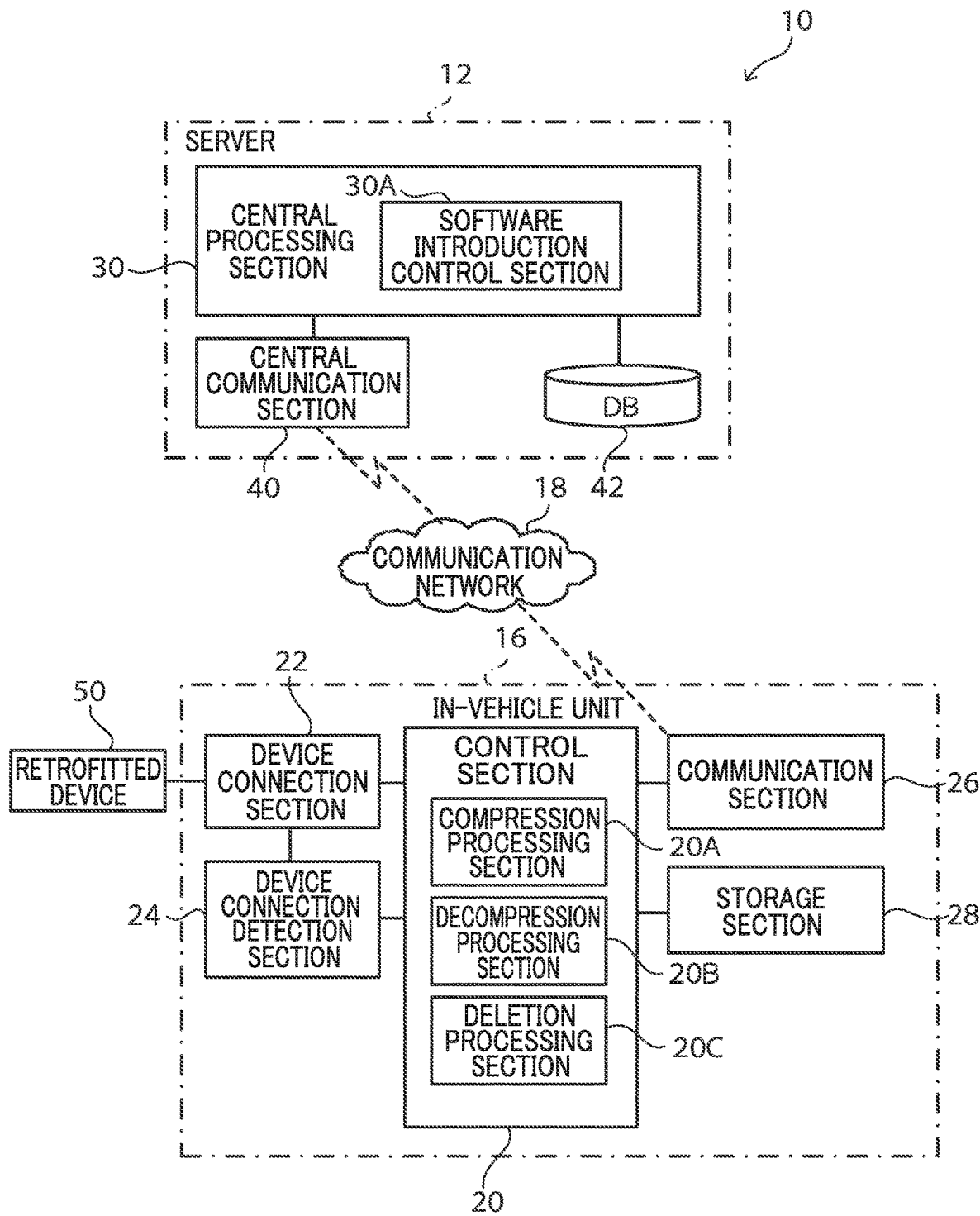
FIG. 2 is a block diagram illustrating functional configurations of a server and an in-vehicle unit of an in-vehicle system according to a first exemplary embodiment.

FIG. 2 is a detailed block diagram illustrating functional configurations of the server 12 and the in-vehicle unit 16 of the in-vehicle system 10 according to a first exemplary embodiment.

As illustrated in FIG. 2, each of the in-vehicle units 16 includes a control section 20, a device connection section 22, a device connection detection section 24 (a hardware connection detector, or a hardware connection detection circuit) serving as an example of a detection section, a communication section 26 (a communication circuit, a communication interface, a network interface), and a storage section 28.

The device connection section 22 connects to a retrofitted device 50, serving as predetermined hardware, and exchanges information with the retrofitted device 50. Various connection methods, for example a universal serial bus (USB), a universal asynchronous receiver-transmitter (UART), or various wireless connection protocols, may be adopted for the device connection section 22.

The device connection detection section 24 detects whether or not the retrofitted device 50 is connected to the device connection section 22, and notifies the control section 20 of a detection result.

The communication section 26 establishes communication with the server 12 over the communication network 18, and transmits and receives information to and from the server 12.

The storage section 28 is stored with various software, for example application programs, drivers, and the like, that have been downloaded from the server 12 and installed, as well as being stored with various data.

The control section 20 is configured by a generic microcomputer including a central processing unit (CPU), read only memory (ROM), random access memory (RAM), and the like. The control section 20 performs various processing relating to installation, compression, decompression, deletion, and the like of application programs, and also performs processing according to installed applications.

Specifically, the control section 20 include the functionality of a compression processing section 20A, a decompression processing section 20B, and a deletion processing section 20C. The respective functionality of the control section 20 is implemented by the CPU expanding a program stored in the ROM into the RAM, and executing this program.

In cases in which a predetermined first condition has been met, the compression processing section 20A performs processing to compress the software, for example an application or driver, that has been downloaded from the server 12 and installed in the storage section 28 of the in-vehicle unit 16. The first condition may be a non-connection detection count or a non-connection duration of the device corresponding to the software. For example, determination may be made based on the detection result of the device connection detection section 24 as to whether or not a non-connection detection count detected for the device corresponding to the software is a predetermined first threshold value or greater, with the first condition being met in cases in which the detected non-connection detection count is the first threshold value or greater. Alternatively, determination may be made based on the detection result of the device connection detection section 24 as to whether or not a non-connection duration detected for the device corresponding to the software is a predetermined first threshold value or greater, with the first condition being met in cases in which the detected non-connection duration is the first threshold value or greater.

The decompression processing section 20B performs processing to decompress compressed software in cases in which the device corresponding to the software is connected after the software has been compressed by the compression processing section 20A.

In cases in which a predetermined second condition has been met after the first condition has been met, the deletion processing section 20C performs processing to delete software installed in the in-vehicle unit 16 from the storage section 28. Similarly to the first condition, the second condition may be a non-connection detection count or a non-connection duration of the device corresponding to the software. For example, determination may be made based on the detection result of the device connection detection section 24 as to whether or not a non-connection detection count detected for the device corresponding to the software is a predetermined second threshold value or greater, with the second condition being met in cases in which the detected non-connection detection count is the second threshold value or greater. Alternatively, determination may be made based on the detection result of the device connection detection section 24 as to whether or not a non-connection duration detected for the device corresponding to the software is a predetermined second threshold value or greater, with the second condition being met in cases in which the detected non-connection duration is the second threshold value or greater. Note that since the software is deleted in cases in which the second condition has been met, the second condition is preferably more difficult to meet than the first condition. Specifically, the second threshold value for the second condition is preferably a higher threshold than the first threshold value for the first condition.

The server 12 includes a central processing section 30, a central communication section 40, and a database (DB) 42.

The central processing section 30 is configured by a generic microcomputer including a CPU, ROM, RAM, and the like. The central processing section 30 includes the functionality of a software introduction control section 30A, serving as an example of an installer section. The functionality of the software introduction control section 30A of the central processing section 30 is implemented by the CPU expanding a program stored in the ROM into the RAM, and executing this program.

The software introduction control section 30A communicates with the in-vehicle unit 16 in order to when the retrofitted device 50 is connected to the in-vehicle unit 16 in order to perform processing to read a corresponding application from the DB 42 and install this application in the in-vehicle unit 16.

The central communication section 40 establishes communication with the respective in-vehicle units 16 over the communication network 18, and transmits and receives various information.

The DB 42 is a repository for various application programs, driver software, and the like that may be installed in the in-vehicle units 16, as well as various data.

Next, explanation follows regarding specific processing performed by the various sections of the in-vehicle system 10 according to the present exemplary embodiment configured as described above.

Figure 3:
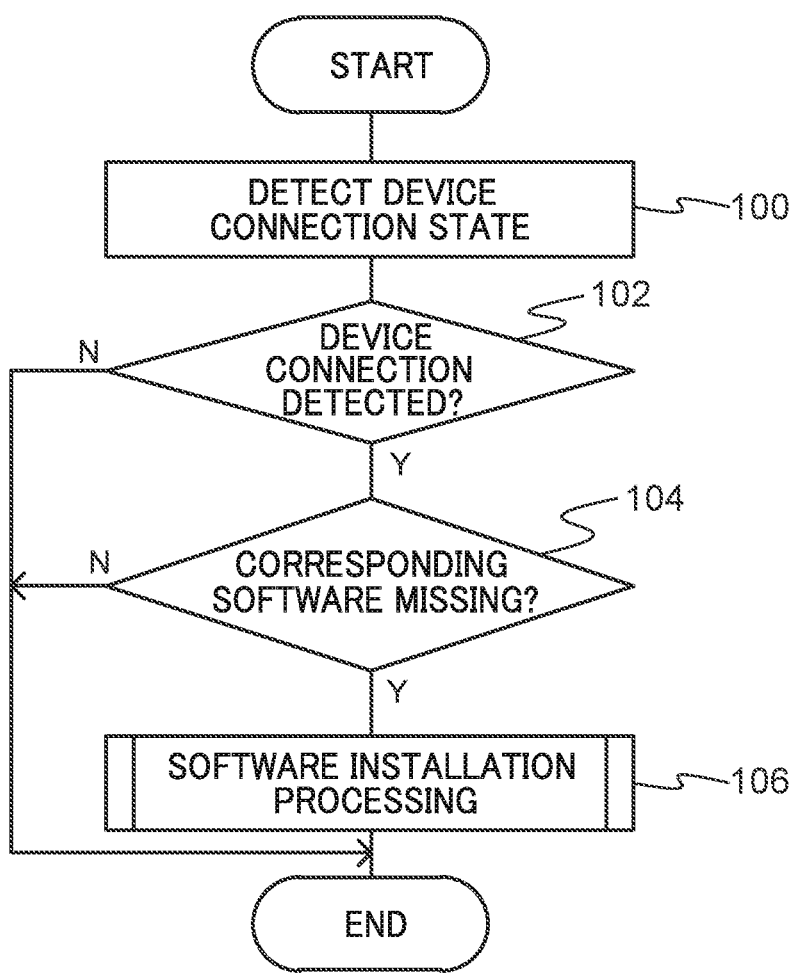
FIG. 3 is a flowchart illustrating an example of a flow of processing performed by an in-vehicle unit of an in-vehicle system according to the first exemplary embodiment when installing software corresponding to a retrofitted device connected to a device connection section.

First, explanation follows regarding processing performed by the in-vehicle units 16 when installing software corresponding to the retrofitted device 50 connected to the device connection section 22. FIG. 3 is a flowchart illustrating an example of a flow of processing performed in the in-vehicle units 16 of the in-vehicle system 10 according to the present exemplary embodiment when installing software corresponding to the retrofitted device 50 connected to the device connection section 22. For example, the processing in FIG. 3 is started when a switch such as an ignition switch is switched on in order to start up the corresponding vehicle 14.

At step S100, the control section 20 detects a connection state of the retrofitted device 50 to the device connection section 22, and then processing transitions to step 102. Namely, the control section 20 detects the connection state of the retrofitted device 50 based on a detection result of the device connection detection section 24.

At step 102, the control section 20 determines whether or not connection of a device has been detected. Processing transitions to step 104 in cases in which determination is affirmative, and the processing routine is ended in cases in which determination is negative.

At step 104, the control section 20 determines whether or not software corresponding to the connected retrofitted device 50 is missing. Determination is affirmative and processing transitions to step 106 in cases in which software corresponding to the retrofitted device 50 has not yet been installed. The processing routine is ended in cases in which the software corresponding to the retrofitted device 50 has already been installed.

At step 106, the control section 20 performs software installation processing, and then the processing routine is ended. In the software installation processing, an installation request for the software corresponding to the retrofitted device 50 is made to the server 12 via the communication section 26, and the software introduction control section 30A of the server 12 transmits the software corresponding to the installation request to the corresponding in-vehicle unit 16 and installs the software. The retrofitted device 50 is thus rendered usable.

Figure 4:
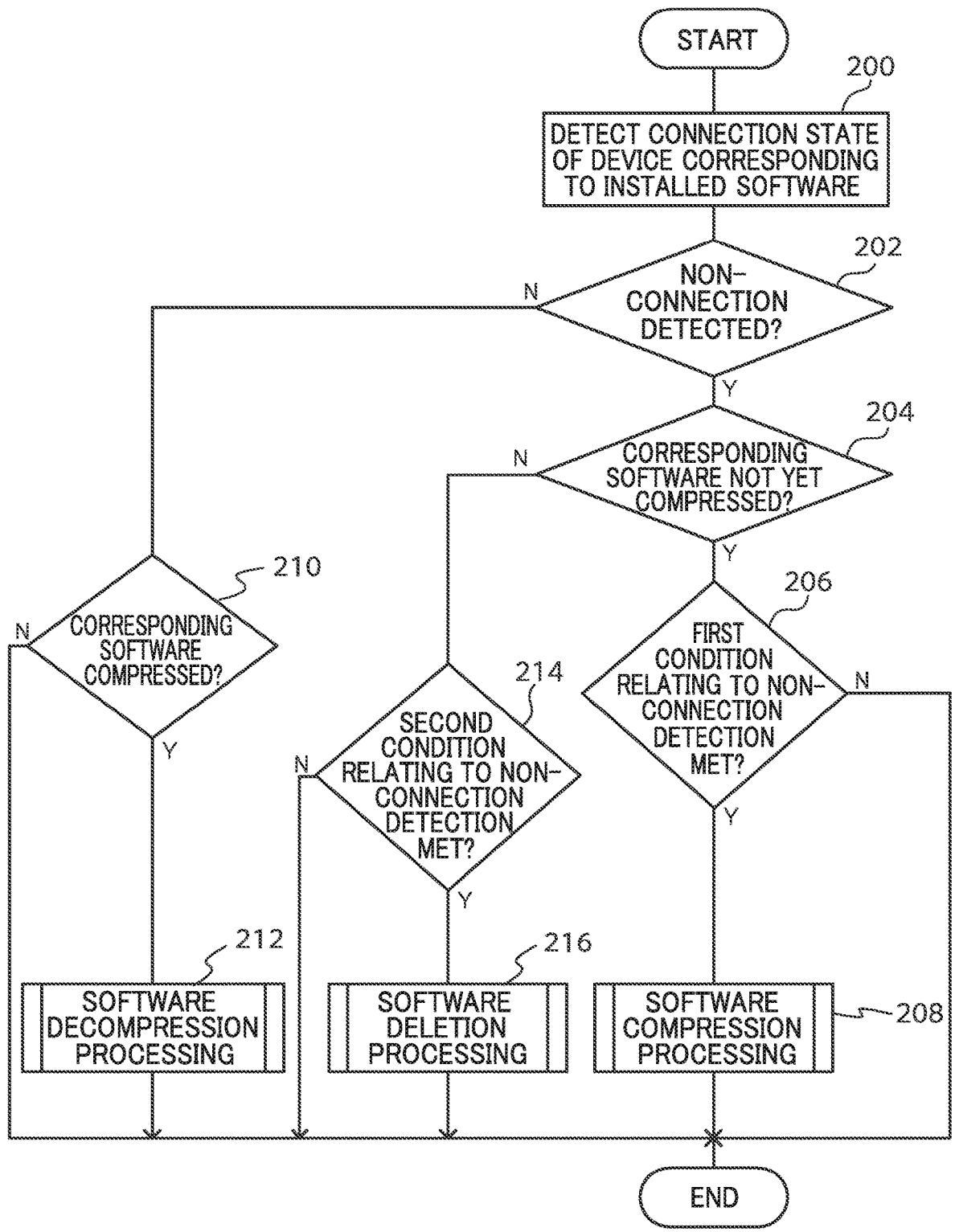
FIG. 4 is a flowchart illustrating an example of a flow of processing performed by an in-vehicle unit of an in-vehicle system according to the first exemplary embodiment when performing processing according to a connection state of a retrofitted device corresponding to installed software.

Next, explanation follows regarding processing performed by the in-vehicle units 16 according to the connection state of the retrofitted device 50 corresponding to the software installed as described above. FIG. 4 is a flowchart illustrating an example of a flow of processing performed by the in-vehicle units 16 of the in-vehicle system 10 of the present exemplary embodiment according to the connection state of the retrofitted device 50 corresponding to the installed software. Note that the processing in FIG. 4 is performed following the processing in FIG. 3.

At step 200, the control section 20 detects a connection state of the device corresponding to the installed software, and then processing transitions to step 202. Namely, the control section 20 acquires a detection result from the device connection detection section 24 in order to detect whether or not the retrofitted device 50 corresponding to the installed software is connected to the device connection section 22.

At step 202, the control section 20 determines whether or not non-connection has been detected. This determination is determination based on the detection result regarding the device connection state, and is determination as to whether or not the retrofitted device 50 corresponding to the installed software has been disconnected from the device connection section 22. Processing transitions to step 204 in cases in which this determination is affirmative, and processing transitions to step 210 in cases in which determination is negative.

At step 204, the control section 20 determines whether or not the software corresponding to the retrofitted device 50 that has been disconnected from the device connection section 22 is not yet compressed. This determination is determination as to whether or not software compression processing, described later, is still to be performed. Processing transitions to step 206 in cases in which this determination is affirmative, and processing transitions to step 214 in cases in which determination is negative.

At step 206, the control section 20 determines whether or not the first condition relating to non-connection detection has been met. For example, this determination is determination as to whether or not the detection count or detection duration of the non-connection of the retrofitted device 50 has reached the predetermined first threshold value or greater. Processing transitions to step 208 in cases in which determination is affirmative, and the processing routine is ended in cases in which determination is negative.

At step 208, the control section 20 performs the software compression processing and then the processing routine is ended. The software compression processing is processing performed by the compression processing section 20A to compress the software, for example an application or driver, corresponding to the retrofitted device 50 in cases in which the first condition relating to the non-connection detection has been satisfied. By compressing unused software in this manner, the storage capacity of the control section 20 can be increased, enabling this storage capacity to be used more efficiently. Moreover, should the retrofitted device 50 be reconnected later, the software can easily be used again.

On the other hand, in cases in which the determination of step 202 is negative, namely in cases in which connection of the retrofitted device 50 to the device connection section 22 is detected and processing accordingly transitions to step 210, the control section 20 determines whether or not the software corresponding to the retrofitted device 50 that was previously disconnected from the device connection section 22 has been compressed. This determination is determination as to whether or not the software has been subjected to the software compression processing at step 208 and compressed. Processing transitions to step 212 in cases in which determination is affirmative, and the processing routine is ended in cases in which determination is negative.

At step 212, the control section 20 performs software decompression processing, and then the processing routine is ended. In the software decompression processing, the decompression processing section 20B performs processing to decompress the compressed software, for example an application or driver, corresponding to the retrofitted device 50 connected to the device connection section 22. Since the retrofitted device 50 is rendered usable by decompressing the software once the retrofitted device 50 has been reconnected to the device connection section 22, the software can easily be used again, without the need to reinstall.

In cases in which determination is negative at step 204, namely in cases in which the software corresponding to the retrofitted device 50 that has been disconnected from the device connection section 22 is already compressed and processing accordingly transitions to step 214, the control section 20 determines whether or not the second condition relating to non-connection detection has been met. This determination is, for example, determination as to whether or not the detection count or detection duration of non-connection of the retrofitted device 50 has reached the predetermined second threshold value or greater. Processing transitions to step 216 in cases in which determination is affirmative, and the processing routine is ended in cases in which determination is negative.

At step 216, the control section 20 performs software deletion processing, and then the processing routine is ended. In the software deletion processing, the deletion processing section 20C performs processing to delete the software, for example an application or driver, corresponding to the retrofitted device 50 in cases in which the second condition relating to non-connection detection has been satisfied. Unnecessary software with a low usage frequency and that is no longer used is thus uninstalled, enabling the storage capacity of the control section 20 to be increased, and thereby enabling this storage capacity to be used more efficiently.

Performing the processing described above enables compression, decompression, and deletion of the software corresponding to the retrofitted device 50 to be performed as required, thereby enabling the storage capacity of the in-vehicle unit 16 to be used more efficiently.

Second Exemplary Embodiment

Figure 5:
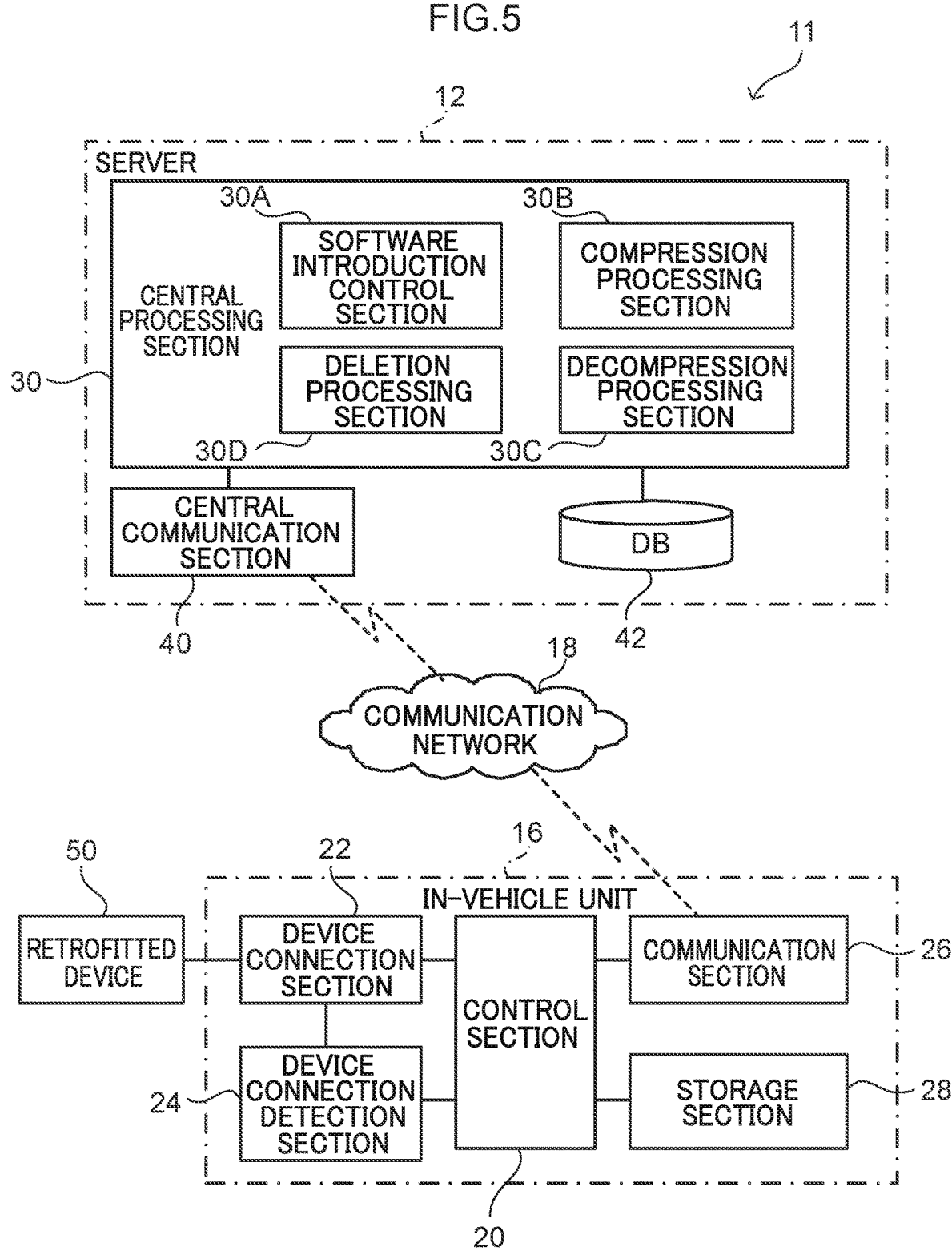
FIG. 5 is a detailed block diagram illustrating functional configurations of a server and an in-vehicle unit of an in-vehicle system according to a second exemplary embodiment.

Next, explanation follows regarding an in-vehicle system 11 according to a second exemplary embodiment. FIG. 5 is a detailed block diagram illustrating functional configurations of a server 12 and an in-vehicle unit 16 of the in-vehicle system 11 according to the second exemplary embodiment. Note that configurations equivalent to those in FIG. 1 are allocated the same reference numerals, and detailed explanation thereof is omitted.

In the exemplary embodiment described previously, explanation was given regarding an example in which the control section 20 of the in-vehicle unit 16 is provided with the functionality of the compression processing section 20A, the decompression processing section 20B, and the deletion processing section 20C. However, in the present exemplary embodiment, the central processing section 30 of the server 12 is provided with the functionality of a compression processing section 30B, a decompression processing section 30C, and a deletion processing section 30D.

The compression processing section 30B accesses the corresponding in-vehicle unit 16 over the communication network 18 in response to a request from the in-vehicle unit 16, and performs processing to compress software, for example an application or driver, by wireless remote operation.

The decompression processing section 30C accesses the corresponding in-vehicle unit 16 over the communication network 18 in response to a request from the in-vehicle unit 16, and performs processing to decompress compressed software, for example an application or driver, by wireless remote operation.

The deletion processing section 30D accesses the corresponding in-vehicle unit 16 over the communication network 18 in response to a request from the in-vehicle unit 16, and performs processing to delete software, for example an application or driver, by wireless remote operation.

In the present exemplary embodiment, detection of non-connection of the retrofitted device 50 is also performed by the central processing section 30 of the server 12. In the present exemplary embodiment, explanation is given regarding an example in which meeting of the second condition is determined on the server 12 side; however, meeting of the first condition may also be determined on the server 12 side.

Next, explanation follows regarding specific processing performed by the respective sections of the in-vehicle system 11 according to the present exemplary embodiment configured as described above. Note that the processing performed by the in-vehicle unit 16 when installing software corresponding to the retrofitted device 50 connected to the device connection section 22 is similar to that of the exemplary embodiment described previously, and so explanation thereof is omitted.

Explanation follows regarding processing performed by the in-vehicle unit 16 according to the connection state of the retrofitted device 50 corresponding to the installed software. FIG. 6 is a flowchart illustrating an example of a flow of processing performed by the in-vehicle units 16 of the in-vehicle system 11 according to the present exemplary embodiment according to the connection state of the retrofitted device 50 corresponding to the installed software. Note that the processing in FIG. 6 is performed following the processing in FIG. 3. Processing that matches that appearing in FIG. 4 is explained using the same reference numerals.

At step 200, the control section 20 detects the connection state of a device corresponding to installed software, and then processing transitions to step 201. Namely, the control section 20 acquires a detection result from the device connection detection section 24 in order to detect whether or not the retrofitted device 50 corresponding to the installed software is connected to the device connection section 22.

At step 201, the control section 20 notifies the server 12 of the detection result for the device connection state, and then processing transitions to step 202.

At step 202, the control section 20 determines whether or not non-connection has been detected. This determination is determination based on a detection result regarding the device connection state, and is determination as to whether or not the retrofitted device 50 corresponding to the installed software has been disconnected from the device connection section 22. Processing transitions to step 204 in cases in which this determination is affirmative, and processing transitions to step 210 in cases in which determination is negative.

At step 204, the control section 20 determines whether or not the software corresponding to the retrofitted device 50 that has been disconnected from the device connection section 22 is not yet compressed. This determination is determination as to whether or not software compression processing, described later, is still to be performed. Processing transitions to step 206 in cases in which this determination is affirmative, and processing transitions to step 214 in cases in which determination is negative.

At step 206, the control section 20 determines whether or not the first condition relating to non-connection detection has been met. For example, this determination is determination as to whether or not the detection count or detection duration of the non-connection of the retrofitted device 50 has reached the predetermined first threshold value or greater. Processing transitions to step 207 in cases in which determination is affirmative, and the processing routine is ended in cases in which determination is negative.

At step 207, the control section 20 makes a software compression request to the server 12, and then processing transitions to step 209.

At step 209, the control section 20 accepts compression processing from the server 12, and then the processing routine is ended. Namely, the software, for example an application or driver corresponding to the retrofitted device 50 that has satisfied the first condition relating to non-connection detection, is compressed by wireless remote operation by the compression processing section 30B of the server 12. By compressing unused software in this manner, the storage capacity of the control section 20 can be increased, enabling this storage capacity to be used more efficiently. Moreover, should the retrofitted device 50 be reconnected later, the software can easily be used again.

On the other hand, in cases in which the determination of step 202 is negative, namely in cases in which connection of the retrofitted device 50 to the device connection section 22 is detected and processing accordingly transitions to step 210, the control section 20 determines whether or not the software corresponding to the retrofitted device 50 that was previously disconnected from the device connection section 22 has been compressed. This determination is determination as to whether or not the software has been subjected to the software compression processing by the server 12 and compressed. Processing transitions to step 211 in cases in which determination is affirmative, and the processing routine is ended in cases in which determination is negative.

At step 211, the control section 20 makes a software decompression request to the server 12, and then processing transitions to step 213.

At step 213, the control section 20 accepts decompression processing from the server 12, and then the processing routine is ended. Namely, the compressed software, for example an application or driver corresponding to the retrofitted device 50 connected to the device connection section 22, is decompressed by wireless remote operation by the decompression processing section 30C of the server 12. Since the retrofitted device 50 is rendered usable by decompressing the software once the retrofitted device 50 has been reconnected to the device connection section 22, the software can easily be used again, without the need to reinstall.

In cases in which determination is negative at step 204, namely in cases in which the software corresponding to the retrofitted device 50 that has been disconnected from the device connection section 22 is already compressed, processing accordingly transitions to step 215, and the control section 20 determines whether or not a second-condition-met signal has been received from the server 12. This determination is, for example, determination as to whether or not a second-condition-met signal indicating that the detection count or detection duration of non-connection of the retrofitted device 50 has reached the predetermined second threshold value or greater has been received from the server 12. Processing transitions to step 217 in cases in which determination is affirmative, and the processing routine is ended in cases in which determination is negative.

At step 217, the control section 20 makes a software deletion request to the server 12, and then processing transitions to step 219.

At step 219, the control section 20 accepts deletion processing from the server 12, and then the processing routine is ended. Namely, the software, for example an application or driver corresponding to the retrofitted device 50 that has satisfied the second condition relating to non-connection detection, is deleted by wireless remote operation by the deletion processing section 30D of the server 12. Unnecessary software with a low usage frequency and that is no longer used is thus uninstalled, enabling the storage capacity of the control section 20 to be increased, and thereby enabling this storage capacity to be used more efficiently.

Next, explanation follows regarding processing performed by the server 12 according to the connection state of the retrofitted device 50 corresponding to installed software. FIG. 7 is a flowchart illustrating an example of a flow of processing performed by the server 12 of the in-vehicle system 11 of the present exemplary embodiment according to the connection state of the retrofitted device 50 corresponding to installed software. Note that the processing in FIG. 7 is started when the server 12 has been notified of the detection result for the connection state of the device at step 201, described above.

At step 300, the central processing section 30 receives the detection result for the connection state of the retrofitted device 50 via the central communication section 40, and then processing transitions to step 302.

At step 302, the central processing section 30 determines whether or not the received detection result indicates a non-connected state. Processing transitions to step 304 in cases in which determination is affirmative, and processing transitions to step 310 in cases in which determination is negative.

At step 304, the central processing section 30 determines whether or not the second condition relating to non-connection detection has been met. This determination is determination as to whether or not the detection count or detection duration of non-connection of the retrofitted device 50 has reached the predetermined second threshold value or greater, for example based on the detection result for the connection state of the retrofitted device 50 received from the in-vehicle unit 16. Processing transitions to step 306 in cases in which determination is negative, and processing transitions to step 314 in cases in which determination is affirmative.

At step 306, the central processing section 30 determines whether or not the first condition relating to non-connection detection has been met. This determination is determination as to whether or not a software compression request from the in-vehicle unit 16 has been made at step 207. Processing transitions to step 308 in cases in which determination is affirmative, and the processing routine is ended in cases in which determination is negative.

At step 308, the central processing section 30 performs the software compression processing, and then the processing routine is ended. In the software compression processing performed in response to the request from the in-vehicle unit 16, the compression processing section 30B accesses the in-vehicle unit 16 over the communication network 18 and performs processing to compress the software, for example an application or driver, by wireless remote operation. By compressing unused software in this manner, the storage capacity of the control section 20 can be increased, enabling this storage capacity to be used more efficiently. Moreover, should the retrofitted device 50 be reconnected later, the software can easily be used again.

On the other hand, in cases in which the determination of step 302 is negative, namely in cases in which the detection result for the connection state of the retrofitted device 50 received from the in-vehicle unit 16 indicates a connected state and processing accordingly transitions to step 310, the central processing section 30 determines whether or not the software corresponding to the retrofitted device 50 that has been disconnected from the device connection section 22 has been compressed. This determination is determination as to whether or not the software has been subjected to the software compression processing at step 308 and compressed. Processing transitions to step 312 in cases in which determination is affirmative, and the processing routine is ended in cases in which determination is negative.

At step 312, the central processing section 30 performs the software decompression processing, and then the processing routine is ended. In the software decompression processing, in response to the request from the in-vehicle unit 16, the decompression processing section 30C accesses the in-vehicle unit 16 over the communication network 18 and performs processing to decompress the compressed software, for example an application or driver, by wireless remote operation. Since the retrofitted device 50 is rendered usable by decompressing the software once the retrofitted device 50 has been reconnected to the device connection section 22, the software can easily be used again, without the need to reinstall.

Moreover, in cases in which the determination of step 304 is affirmative, namely in cases in which the software corresponding to the retrofitted device 50 that has been disconnected from the device connection section 22 has been compressed and also meets the second condition relating to non-connection detection, processing accordingly transitions to step 314 and the control section 20 transmits the second-condition-met signal indicating that the second condition relating to non-connection detection has been met to the in-vehicle unit 16, and then processing transitions to step 316. As a result, the corresponding in-vehicle unit 16 makes affirmative determination at step 215, described above.

At step 316, the central processing section 30 performs the software deletion processing, and then the processing routine is ended. In the software deletion processing, in response to the request from the in-vehicle unit 16, the deletion processing section 30D accesses the in-vehicle unit 16 over the communication network 18 and performs processing to delete the software, for example an application or driver, by wireless remote operation. Unnecessary software with a low usage frequency and that is no longer used is thus uninstalled, enabling the storage capacity of the control section 20 to be increased, and thereby enabling this storage capacity to be used more efficiently.

In this manner, even when the functionality of the compression processing section 30B, the decompression processing section 30C, and the deletion processing section 30D is provided to the central processing section 30 of the server 12, compression, decompression, and deletion of software corresponding to the retrofitted device 50 can be performed as required, similarly to in the exemplary embodiment described previously, thus enabling the storage capacity of the in-vehicle unit 16 to be used more efficiently.

Moreover, providing the functionality of the compression processing section 30B, the decompression processing section 30C, and the deletion processing section 30D on the server 12 side enables the capacity required to store compression and deletion programs in the in-vehicle unit 16 to be reduced, thus enabling the storage capacity to be used even more efficiently.

Note that although fixed values may be employed as the threshold values (first threshold value and second threshold value) for the detection count or detection duration of non-connection of the retrofitted device 50, these being employed as examples of the first condition and the second condition in the exemplary embodiments described above, processing may be performed to adjust the conditions to be met according to the remaining storage capacity of the in-vehicle unit 16, such that compression or deletion are performed more readily as the storage capacity decreases. For example, the processing of FIG. 8 may be introduced prior to the processing to determine whether or not the first condition has been met and prior to the processing to determine whether or not the second condition has been met, such that whether or not the first condition has been met and whether or not the second condition has been met are determined after first deciding the threshold values for meeting these conditions. FIG. 8 is a flowchart illustrating an example of a flow of processing to adjust the conditions for meeting the first condition and the second condition according to the remaining storage capacity of the in-vehicle unit 16.

Specifically, at step 400, either the control section 20 or the central processing section 30 acquires the remaining storage capacity of the control section 20, and then processing transitions to step 402.

At step 402, either the control section 20 or the central processing section 30 determines whether or not the remaining storage capacity is a predetermined threshold value or greater. Processing transitions to step 404 in cases in which determination is affirmative, and processing transitions to step 406 in cases in which determination is negative.

At step 404, either the control section 20 or the central processing section 30 sets either the first threshold value (in cases in which determination is to be made as to whether or not the first condition has been met) or the second threshold value (in cases in which determination is to be made as to whether or not the second condition has been met) to a predetermined value A.

On the other hand, at step 406 either the control section 20 or the central processing section 30 sets the first threshold value (in cases in which determination is to be made as to whether or not the first condition has been met) or the second threshold value (in cases in which determination is to be made as to whether or not the second condition has been met) to a predetermined value B (A>B), such that compression or deletion are performed more readily than when set to A.

Performing this processing to change the first condition and the second condition according to the remaining storage capacity of the in-vehicle unit 16 enables compression and deletion to be prioritized in order to secure capacity in cases in which the available capacity is low.

Although the processing in FIG. 8 illustrates an example in which the threshold values of the first condition and the second condition are adjusted between the two values A and B, there is no limitation thereto. For example, three or more threshold values may be provided for adjusting the conditions, and predetermined threshold values may be set according to the remaining storage capacity of the in-vehicle unit 16 such that the threshold values for the first condition and the second condition can each be adjusted between three or more values. So doing enables compression or deletion processing to be performed more readily as the remaining storage capacity decreases.

Note that although explanation has been given regarding examples in which the compression processing, deletion processing, and decompression processing are all performed on the in-vehicle unit 16 side in the first exemplary embodiment and on the server 12 side in the second exemplary embodiment, there is no limitation thereto. For example, some out of the compression processing, deletion processing, and decompression processing may be performed on the in-vehicle unit 16 side, with the remaining processing being performed on the server 12 side. Alternatively, plural servers may be provided such that the respective processing is distributed between the in-vehicle units 16 and the plural servers in order to reduce the processing load on each.

Although in the second exemplary embodiment explanation has been given regarding an example in which determination as to whether or not the first condition has been met is performed on the in-vehicle unit 16 side and determination as to whether or not the second condition has been met is performed on the server 12 side, determination as to whether or not the first condition has been met and determination as to whether or not the second condition has been met may both be performed on the in-vehicle unit 16 side as in the first exemplary embodiment. Alternatively, determination as to whether or not the first condition has been met and determination as to whether or not the second condition has been met may both be performed on the server 12 side. Alternatively, determination as to whether or not the first condition has been met may be performed on the server 12 side, and determination as to whether or not the second condition has been met may be performed on the in-vehicle unit 16 side.

Although explanation has been given regarding examples in which the processing performed by the respective sections of the in-vehicle system 10, 11 of the exemplary embodiments described above is configured by software processing implemented by executing programs, there is no limitation thereto. For example, the processing may be performed using hardware such as a graphics processing unit (GPU), an application specific integrated circuit (ASIC), or a field-programmable gate array (FPGA). Alternatively, the processing may be performed using a combination of both software and hardware. In cases in which processing is performed using software, programs may be distributed in a format stored on various types of storage media.

The present disclosure is not limited to the above description, and obviously various modifications may be implemented within a range not departing from the spirit of the present disclosure.

What is claimed is:

1. An in-vehicle unit comprising:
a hardware detector configured to detect whether or not predetermined hardware is connected;
a communication interface configured to perform external communication; and
a processor configured to control so as to receive software corresponding to the predetermined hardware via the communication interface and install the software in cases in which connection of the predetermined hardware has been detected by the hardware detector, and to perform at least one type of processing out of compression processing to compress the software or deletion processing to delete the software in cases in which non-connection of the predetermined hardware has been detected by the hardware detector, wherein
when performing the compression processing and the deletion processing, the processor performs the deletion processing in cases in which a predetermined second condition has been satisfied after performing the compression processing in cases in which the predetermined first condition has been satisfied.

2. The in-vehicle unit of claim 1, wherein the processor is configured to adjust the predetermined second condition to a predetermined condition according to a storage capacity of a storage in which the software is stored, and then determine whether or not the adjusted second condition has been met.

3. The in-vehicle unit of claim 2, wherein the processor is configured to adjust the predetermined first condition to a predetermined condition according to the storage capacity of the storage in which the software is stored, and then determine whether or not the adjusted first condition has been met.

4. The in-vehicle unit of claim 2, wherein the processor further performs decompression processing to decompress the software in cases in which connection of the hardware has been detected by the hardware detector after the predetermined first condition has been satisfied.

5. The in-vehicle unit of claim 2, wherein the processor performs at least one out of the compression processing or deletion processing by external remote operation via the communication interface.

6. The in-vehicle unit of claim 1, wherein the processor is configured to adjust the predetermined first condition to a predetermined condition according to a storage capacity of a storage in which the software is stored, and then determine whether or not the adjusted first condition has been met.

7. The in-vehicle unit of claim 1, wherein the processor further performs decompression processing to decompress the software in cases in which connection of the hardware has been detected by the hardware detector after the predetermined first condition has been satisfied.

8. The in-vehicle unit of claim 1, wherein the processor performs at least one out of the compression processing or deletion processing by external remote operation via the communication interface.

9. An in-vehicle system comprising:
a hardware detector configured to detect whether or not predetermined hardware is connected to an in-vehicle unit;
a first processor configured to control to install software corresponding to the predetermined hardware in the in-vehicle unit in cases in which connection of the predetermined hardware has been detected by the hardware detector; and
a second processor configured to perform at least one type of processing out of compression processing to compress the software or deletion processing to delete the software in cases in which non-connection of the predetermined hardware has been detected by the hardware detector,
wherein
when performing the compression processing and the deletion processing, the second processor performs the deletion processing in cases in which a predetermined second condition has been satisfied after performing the compression processing in cases in which the predetermined first condition has been satisfied.

10. A vehicle comprising:
a hardware detector configured to detect whether or not predetermined hardware is connected;
a communication interface configured to perform external communication; and
a processor configured to control so as to receive software corresponding to the predetermined hardware via the communication interface and install the software in cases in which connection of the predetermined hardware has been detected by the hardware detector, and to perform at least one type of processing out of compression processing to compress the software or deletion processing to delete the software in cases in which non-connection of the predetermined hardware has been detected by the hardware detector,
wherein
when performing the compression processing and the deletion processing, the processor performs the deletion processing in cases in which a predetermined second condition has been satisfied after performing the compression processing in cases in which the predetermined first condition has been satisfied.

\* \* \* \* \*